(12) United States Patent
Engel et al.

(10) Patent No.: US 9,535,174 B2
(45) Date of Patent: Jan. 3, 2017

(54) DIRECT CONVERSION PHOTON COUNTING DETECTOR

(71) Applicant: KONINKLIJKE PHILIPS N.V., Eindhoven (NL)

(72) Inventors: Klaus Juergen Engel, Veldhoven (NL); Roger Steadman Booker, Aachen (DE); Christoph Herrmann, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 41 days.

(21) Appl. No.: 14/427,015

(22) PCT Filed: Sep. 18, 2013

(86) PCT No.: PCT/IB2013/058634
§ 371 (c)(1),
(2) Date: Mar. 10, 2015

(87) PCT Pub. No.: WO2014/045210
PCT Pub. Date: Mar. 27, 2014

(65) Prior Publication Data
US 2015/0234058 A1    Aug. 20, 2015

Related U.S. Application Data

(60) Provisional application No. 61/702,280, filed on Sep. 18, 2012.

(51) Int. Cl.
*G01T 1/24* (2006.01)
(52) U.S. Cl.
CPC ............... *G01T 1/241* (2013.01); *G01T 1/249* (2013.01)

(58) Field of Classification Search
CPC .................................. G01T 1/241; G01T 1/249
See application file for complete search history.

(56) References Cited

U.S. PATENT DOCUMENTS

| | | | | |
|---|---|---|---|---|
| 4,613,314 A | * | 9/1986 | Steele | ...................... H01J 47/02 |
| | | | | 216/52 |
| 5,530,249 A | | 6/1996 | Luke | |
| 5,777,338 A | * | 7/1998 | He | .......................... G01T 1/185 |
| | | | | 250/370.13 |

(Continued)

FOREIGN PATENT DOCUMENTS

WO    2010073189 A1    7/2010

OTHER PUBLICATIONS

Carini, G. A., et al.; Synchrotron Radiation Response Characterization of Coplanar Grid CZT Detectors; 2004; IEEE Nuclear Science Symposium Record; pp. 4264-4267.

(Continued)

*Primary Examiner* — Christine Sung (57) ABSTRACT

The present invention discloses a pixilated direct conversion photon counting detector with a direct conversion material layer and a pixilated electrode. Individual electrode pixels are segmented into three segments (510, 520, 530), wherein one of the segments (520) is operated at a more electrically repellant value than that of the other two (510, 530). Said other two segments are connected to electric circuitry (610, 611, 620, 630) that is arranged to generate signals which are indicative of a count of electrons or holes that approach each of the respective electrode pixel segments and to subtract the generated signals from each other.

17 Claims, 9 Drawing Sheets

(56) References Cited

U.S. PATENT DOCUMENTS

| | | |
|---|---|---|
| 6,333,504 B1 | 12/2001 | Lingren et al. |
| 7,315,025 B2 | 1/2008 | Yokoi et al. |
| 7,705,320 B2 | 4/2010 | Soldner |
| 2007/0290142 A1 | 12/2007 | Du et al. |
| 2010/0252744 A1 | 10/2010 | Herrmann et al. |
| 2013/0168557 A1 | 7/2013 | Herrmann et al. |

OTHER PUBLICATIONS

Eskin, J. D., et al.; Signals induced in semiconductor gamma-ray imaging detectors; 1999; Journal of Applied Physics; 85(2)647-659.

Niraula, M., et al.; Study of Multi-Electrodes Structure in CdTe Nuclear Radiation Detectors; 2004; IEEE Nuclear Science Symposium Record; vol. 7:4532-4534.

\* cited by examiner

DIRECT CONVERSION PHOTON COUNTING DETECTOR

CROSS REFERENCE TO RELATED APPLICATIONS

This application is a national filing of PCT application Serial No. PCT/IB2013/058634, filed Sep. 18, 2013, published as WO 2014/045210 A2 on Mar. 27, 2014, which claims the benefit of U.S. provisional application Ser. No. 61/702,280 filed Sep. 18, 2012, which is incorporated herein by reference.

BACKGROUND OF THE INVENTION

The present invention generally relates to a direct conversion photon counting detector, an imaging system and a method to detect photons with a direct conversion photon counting detector.

Direct conversion photon counting detectors are well-known in the art for single photon detection in for instance astrophysics or medical imaging, such as computed tomography (CT), positron emission tomography (PET), single photon emission computed tomography (SPECT) and the like. A direct conversion photon counting detector is disclosed in J. D. Eskin et. al, Journal of Applied Physics, volume 85, Number 2, page 647-659, 15 Jan. 1999.

A bulk of a direct conversion photon counting detector is composed of a layer of a direct conversion material, usually a single-crystal semi-conductor. Inbound radiation (such as x-rays, γ-rays) is absorbed by the direct conversion material and, due to a photo-electric interaction, mobile electron-hole pairs are generated in the direct conversion material. Because the direct conversion material is placed between a detector cathode on one side and a detector anode on an opposite side, generated electrons move along an imposed electrical field towards the detector anode, while generated holes move in opposite direction towards the detector cathode. Approaching electrons induce a local charge in the detector cathode. The detector anode may be sub-divided into a series or a grid of electrode pixels. When each of the electrode pixels has a sufficiently small area and is individually read out, a value representing count of electrons that impacted each electrode pixel, based on the induced charge per pixel, can be determined.

The smaller the electrode pixel area, the narrower a detectable pulse width and the higher a detectable photon flux rate. However, there are limitations to reducing electrode pixel area, most importantly because of cross-talk between adjacent electrode pixels due to charge sharing. To obtain narrower pulses for still relatively large pixel areas, individual electrode pixels are usually sub-segmented, wherein only an as small as possible part of the electrode pixel area is dedicated to electron or hole collecting. This area is commonly named a collecting electrode. The collecting electrode is connected to a signal amplifier and a value for an amount of inbound electrons or holes collected by the collecting electrode is generated from an amplified signal. A remaining electrode pixel area is dedicated to direct inbound electrons or holes towards the collecting electrode. This is usually achieved by applying a higher potential difference between the collecting electrode and the remaining electrode pixel area (e.g. the collecting electrode is at ground potential, while the remaining electrode pixel area has a negative potential). The detectable pulse width is strongly reduced compared to a configuration where a non-sub-segmented pixel area is used for signal generation.

When the remaining electrode pixel area is only dedicated to steering the electrons or holes towards the collecting electrode, it is commonly referred to in the art as a steering electrode. An alternate configuration is a so-called coplanar grid. In this configuration also a current pulse is induced for an amount of inbound electrons or holes that still approach near the remaining electrode pixel area, which, similar to a steering electrode, is operated under a repelling electric potential such that electrons or holes are steered towards a collecting electrode. The repelling electrode in this case is named a non-collecting electrode in the art. In contrast to a configuration with a steering electrode, both the collecting and the non-collecting electrode are connected to signal amplifiers. Amplified signals from the collecting and non-collecting electrodes are subtracted from each other, optionally in a weighted fashion. Approaching inbound electrons or holes are initially far away from the targeted electrode pixel and an equal amount of signal is capacitively induced into the collecting and non-collecting electrodes. As a result from the signal subtraction the signals cancel each other, except when inbound electrons approach near the collecting electrode. At that moment the induced signals become significantly different from each other and a relatively short pulse width may be generated as a result of subtracting the signals, provided that the electrons or holes are collected by the collecting electrode only.

While both steering electrode and coplanar grid configurations manage to reduce pulse width, there is a need to further reduce the pulse width. It is inherent to these configurations that charges are trapped near the collecting electrode which polarizes the detector, causing the electrical field to become distorted. This effect is especially limiting performance of the steering electrode configuration. The effect is less severe for coplanar grids, since charges are usually distributed over larger areas in this configuration. However, there needs to be a relatively large potential difference (at least several tens of volts) between the closely neighboring collecting and non-collecting electrodes to ensure good operation, coplanar grids are technically quite challenging to design, manufacture and operate and compromises must be made to overcome the potential difference between the collecting and non-collecting electrodes while subtracting the signals.

SUMMARY OF THE INVENTION

Embodiments according to the present invention are directed to a direct conversion photon counting detector, comprising a detector cathode, a detector anode and a direct conversion material layer. The direct conversion material layer is positioned between said detector cathode and said detector anode. The detector anode and/or detector cathode comprise a plurality of electrode pixels that are adapted to detect a presence of electrons or holes. At least one of the electrode pixels is segmented into at least a first electrode pixel segment, a second electrode pixel segment and a third electrode pixel segment. An electrical potential of the third electrode pixel segment is at a more electrically repellant value than an electrical potential of the first electrode pixel segment and than an electrical potential of the second electrode pixel segment. The detector further comprises electronic circuitry electrically coupled to the first electrode segment and to the second electrode segment to generate a first electrical signal and a second electrical signal respectively. The electronic circuitry comprises a signal subtractor configured to subtract the second electrical signal from the first electrical signal.

Another embodiment according to the present invention is directed towards an imaging device comprising the direct conversion photon counting detector according to the present invention.

A further embodiment according to the present invention is directed towards a method to detect photons with a direct conversion photon counting detector according to the present invention.

Still further aspects and embodiments according to the present invention will be appreciated by those of ordinary skill in the art upon reading and understanding the following detailed description. Numerous additional advantages and benefits will become apparent to those of ordinary skill in the art upon reading the following detailed description of preferred embodiments.

The invention may take form in various components and arrangements of components, and in various process operations and arrangements of process operations. The drawings are only for the purpose of illustrating preferred embodiments and are not to be construed as limiting the invention. To better visualize certain features may be omitted or dimensions may be not be according to scale.

DETAILED DESCRIPTION OF EMBODIMENTS

A direct conversion photon counting detector, an imaging system and a method to detect photons with a direct conversion photon counting detector are disclosed.

Direct conversion photon counting detection is a technique that is predominantly used in astrophysics, medical imaging and non-medical imaging such as luggage scanning. Embodiments of the present invention are described and illustrated relating to medical imaging, in particular to x-ray radiation detection in computed tomography, but a skilled person would understand how to adapt the described embodiments for other types of imaging, including how to adapt the direct conversion photon counting detector for detecting photons with other energy levels (such as gamma-ray radiation).

The embodiments and examples described below are described for the case that electron collection is used. The present invention also covers the case of hole collection. To achieve this, a skilled person would understand that the same embodiments and examples could be adapted by changing the polarity of the electrodes. Hole collection is actually somewhat unusual in the field and a far majority of direct photon counting detectors use electron collection.

Figure 1:
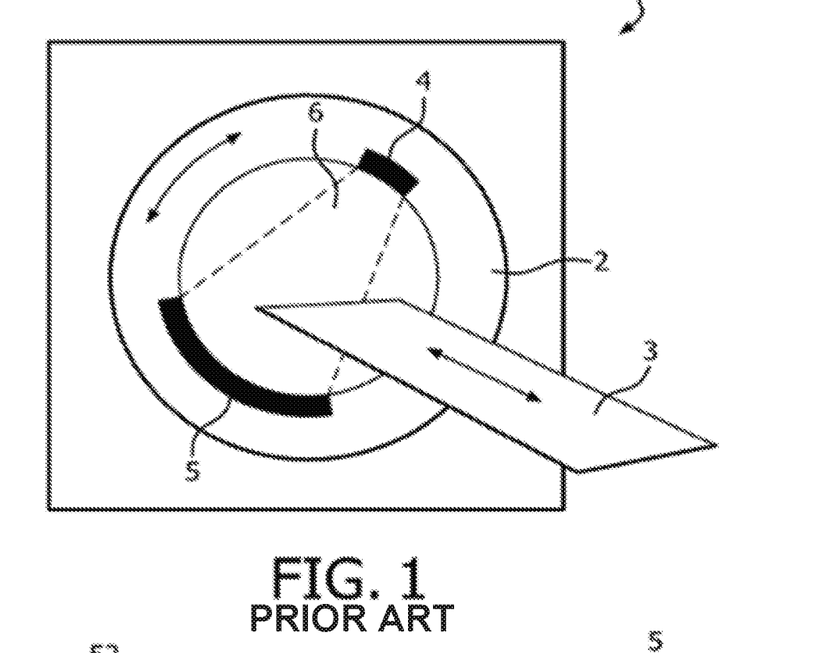
FIG. 1 shows a strongly simplified, schematic example of an imaging device, specifically a computed tomography device, comprising a detector according to the prior art.

An exemplary CT imaging system 1 is schematically depicted in a strongly simplified manner in FIG. 1.

The CT imaging system 1 comprises a gantry 2 housing an x-ray source 4 and a detector 5, which may be a direct conversion photon counting detector according to the present invention. X-rays emitted from the x-ray source 1 traverse an examination region 6 towards the detector 5. A body, such as a patient, can be moved through the examination region 6 on movable bench 3. Gantry 2 is 360 degrees rotatable around the examination region 6 to be able to scan the body from all desired angles. X-rays are attenuated in different amounts by different parts of the body. The detector 5 transmits data about the detected x-rays per specific area to data processing and display units (not shown).

A person skilled in the art would understand that an actual CT system comprises many more alternative, additionally functional or optional features not shown in FIG. 1.

Figure 2:
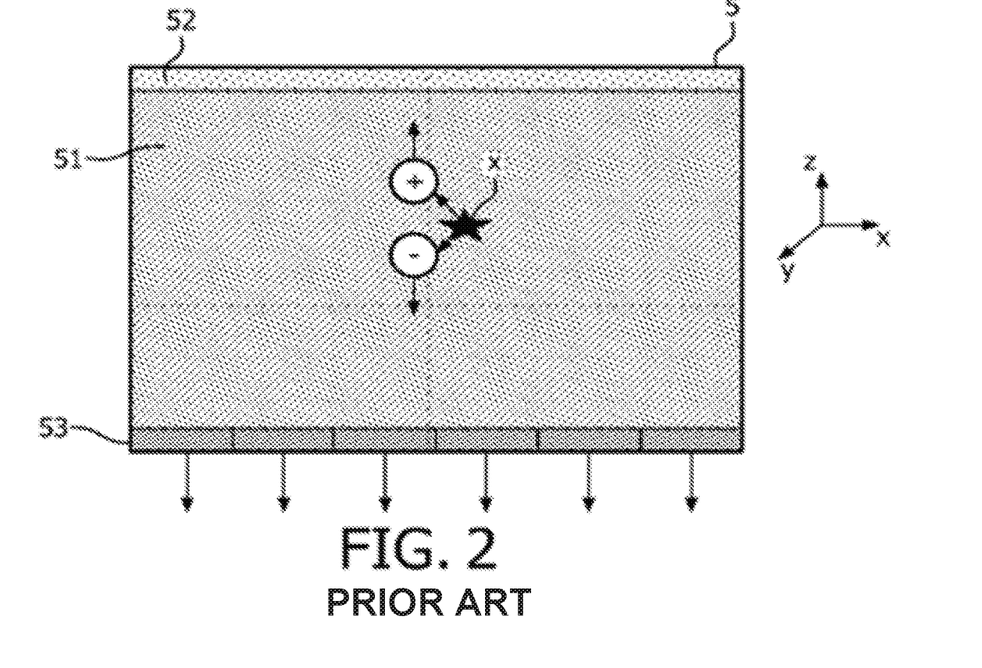
FIG. 2 shows a schematic cross section of a photon counting detector according to the prior art.

FIG. 2 shows a highly schematic depiction of a direct conversion photon counting detector 5 in cross section.

A bulk of the direct photon conversion photon counting detector 5 is formed by direct conversion material layer 51. The direct conversion material layer 51 may be composed of a single-crystal semiconductor material, which is an intrinsic material or has a fully depleted p-i-n structure. $Cd_xZn_{1-x}Te$ (Cadmium Zinc Telluride, commonly abbreviated to CZT) is a suitable semiconductor material in light embodiments of the present invention. The direct conversion layer 51 is placed between detector cathode 52 and detector anode 53. The detector cathode is held at a negative bias potential, while the detector anode is held at a less repelling (usually an attracting positive) potential. The detector cathode 52 forms a continuous layer on the direct conversion material layer 51 and is generally transparent to photons with an energy level that are to be detected by the direct conversion photon counting detector. The detector anode 53 is on the opposite side of the direct conversion layer 51 and is made up from a grid of detector pixels.

When a photon x passes the detector cathode 52 and penetrates into the direct conversion material layer 51, the photon interacts with direct conversion material to generate numerous electron-hole pairs. The positively charged holes drift towards the strongly negatively charged detector cathode 52, while the negatively charged electrons drift towards the more positively charged detector anode 53. When the electrons approach detector anode 53, a signal is induced from each detector pixel, which, after collection, is indicative of a count of electrons that approached that particular electrode pixel. The generated signal is then further processed by processing units (not shown) and eventually displayed on a display unit (not shown) to a user as written information or as a reconstructed image of (part of) an examined body.

Because the detector anode 53 is made up of a grid of smaller electrode pixels, a pulse width is reduced by the so-called small pixel effect, which allows for single-polarity charge sensing. A main part of an inbound pulse is induced by charges (i.e. electrons) while they traverse a small volume around a detector pixel, which corresponds in its spatial dimension to a detector pixel size. Thus an average pulse width can be reduced by reducing the detector pixel size, which therefore increases a maximal detectable photon flux rate. However, a natural limit for a detector pixel size reduction is usually determined by finite charge cloud sizes and x-ray crosstalk effects; in fact energy resolution is destroyed due to charge sharing between neighboring pixels.

Figure 3A:
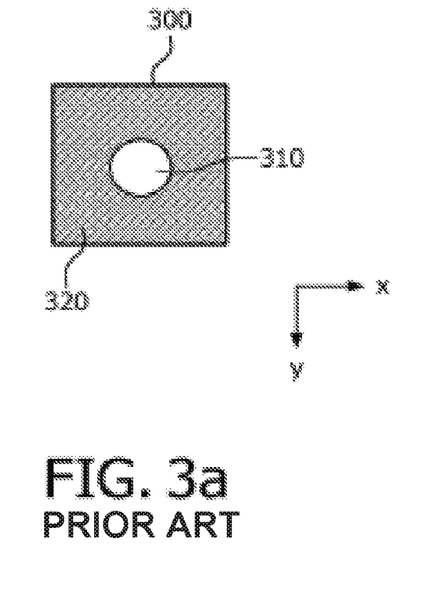
FIG. 3a,b show a schematic electrode pixel configuration of a direct conversion photon counting detector and a grid of electrode pixels of a direct conversion photon counting detector according to the prior art in top view.
Figure 3B:
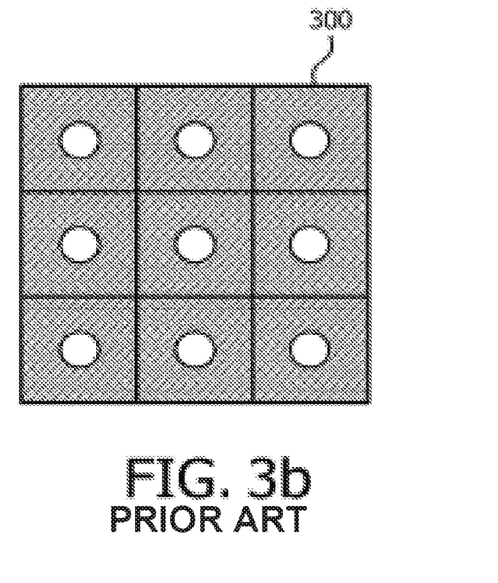
Figure 4A:
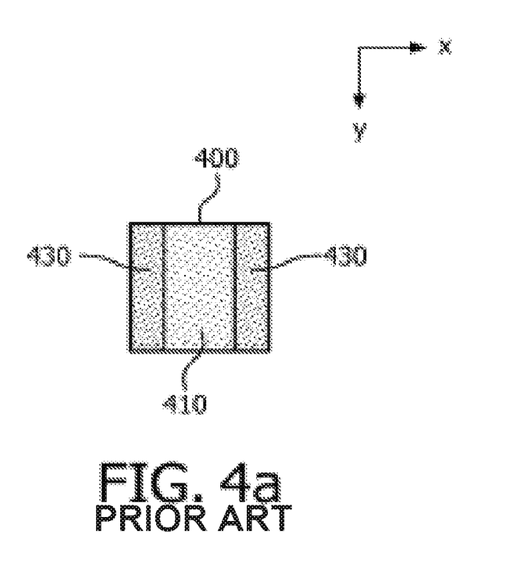
FIG. 4a,b show a schematic alternative electrode pixel configuration of a direct conversion photon counting detector and a grid of electrode pixels of a direct conversion photon counting detector according to the prior art in top view.
Figure 4B:
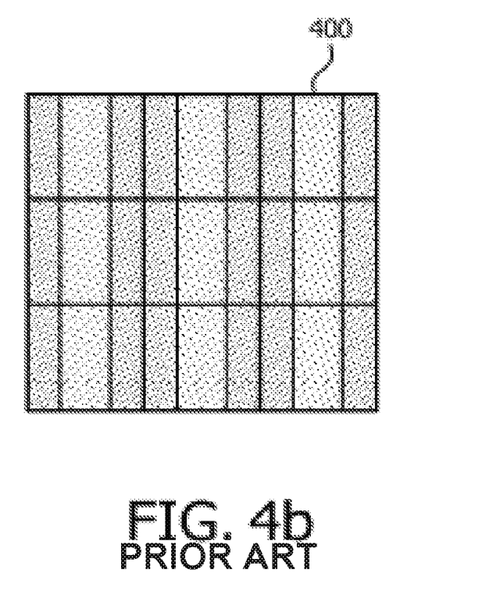

FIGS. 3a and 4a show examples of configurations of individual electrode pixels 300, 400 as used in the prior art. FIGS. 3b and 4b show exemplary three-by-three electrode grid of electrode pixels 300 and electrode pixels 400 respectively. Actual electrode grids normally comprise many more electrode pixels.

FIG. 3a depicts an example of a typical so-called steering electrode pixel configuration. Electrode pixel 300 is sub-segmented into a first electrode pixel segment 310, here called a collecting electrode 310, and a second electrode pixel segment 320, here called a steering electrode. The collecting electrode 310 is made as small as possible and is usually electrically put on ground potential. The steering electrode 320 surrounds the collecting electrode 310 and is negatively charged to guide electrons directly towards the collecting electrode 310, from which the electron signal is acquired. As the collecting electrode 310 is much smaller than a complete electrode pixel 300 area, the pulse width is significantly reduced.

FIG. 4a depicts an example of a typical so-called coplanar grid electrode pixel configuration. Electrode pixel 400 is sub-segmented into a first electrode pixel segment 310, the collecting electrode 410, and a second electrode pixel segment 430, in this configuration named the non-collecting electrode 430, which is split up in two distinct sections of the pixel divided by the collecting electrode 410. As can be seen in FIG. 4b, the non-collecting electrodes 430 and the collecting electrodes 410 form a coplanar grid of alternating lines within the full electrode grid. Similar to the steering electrodes configuration, it has to be avoided that electrons are collected by the non-collecting electrode 430. For this reason the non-collecting electrodes 430 are (negatively) charged compared to the collecting electrodes 410 such that arriving electrons are guided towards the collecting electrodes 410. In contrast to steering electrodes, an electron signal representing an electron count is acquired for both the collecting electrode 410 and the non-collecting electrode 430. Both are usually connected to signal amplifiers, such as current amplifiers (not shown). The (amplified) signals from the collecting electrode 410 and the non-collecting electrode 430 are optionally weighted (e.g. by a factor corresponding to the area ratio between the non-collecting and the collecting electrode) and subtracted from each other. As long as electrons approaching from a bulk are far away from the electrode pixel 400, an almost equal amount of signal is capacitively induced into the collecting electrode 410 and the non-collecting electrode 430. Because of the signal subtraction the signals cancel each other out up to a moment when the electrons are close to the collecting electrode 410. At that moment the signals in the collecting electrode 410 and the non-collecting electrode 430 become significantly different from each other, resulting in a relatively short pulse width.

With prior art electrode pixel configurations charge trapping near the electrode can cause problems due to a local polarization. If an amount of accumulated space charge grows dynamically above a certain limit, an electric field becomes disturbed. As a result, the direct conversion photon counting detector suffers from several disadvantageous effects, as for example modified baseline currents, and massively modified pulse widths, which may cause device failure if the pulse widths become longer than a pulse shaping time used by the electronics. In fact, for known direct conversion photon counting detectors, polarization effects are one of the most important obstacles with respect to a maximum possible count rate.

Steering electrode devices are especially sensitive to polarization, as an amount of trapped charges is almost proportional to a current density. Due to the small area of the collecting electrode, very high current densities occur, i.e. charge trapping near the collecting electrodes provokes local polarization in very sensitive volumes.

Coplanar grid designs are somewhat less sensitive to local polarization as currents are distributed over larger areas. However, at some point the signals from the collecting and the non-collecting electrodes need to be subtracted, pulses of the non-collecting grid have to be offset by said voltage difference which results in increased noise, costs and complexity.

FIGS. 5a to 5m show schematic depictions of single electrode pixel configurations of the direct conversion photon counting detector embodiments of the present invention. To avoid cluttered figures, numbering of electrode pixel sub-segments is only shown for FIGS. 5a and 5b. To identify the different electrode sub-segments each is depicted with a dot pattern (the dots are purely for illustrative reasons and do not represent actual dots on the electrode sub-segments). For each of the FIGS. 5c to 5q the collecting electrode 510 is depicted with the lowest dot density, the steering electrode 520 is depicted with the highest dot density and the non-collecting electrode 530 is depicted with an intermediate dot density.

The electrode pixel of the direct conversion photon counting detector of an embodiment of the present invention is segmented into three segments, in contrast to the two segments of the steering electrode configuration or the coplanar grid configuration of the prior art. The first electrode pixel segment is a collecting electrode 510, which may be sub-segmented into two or more sub-segments. The second electrode segment is a non-collecting electrode 530, which may be sub-divided into two or more sub-segments that may be spatially separated from each other. The third electrode sub-segment is a steering electrode 520, which also may be sub-divided into two or more sub-segments that may be spatially separated from each other.

Figure 5A:
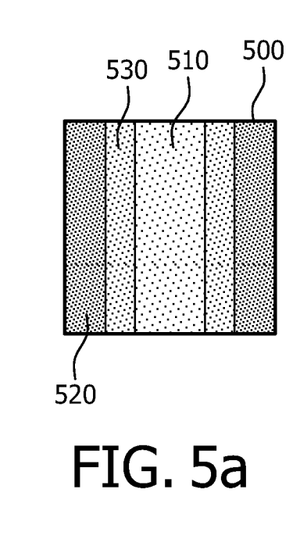
FIG. 5a-n show various schematic embodiments of electrode pixel configurations of a direct conversion photon counting detector according to the present invention, as well as embodiments of grids of electrode pixels of a direct conversion photon counting detector according to embodiments of the present invention in top view.
Figure 5B:
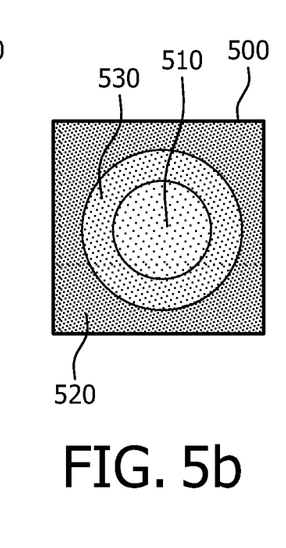
Figure 5C:
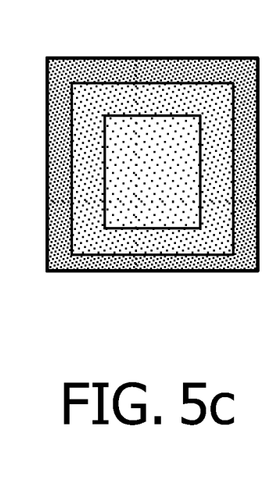
Figure 5D:
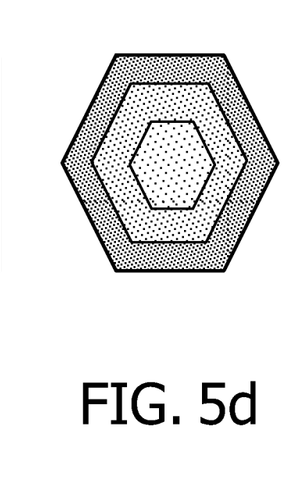
Figure 5E:
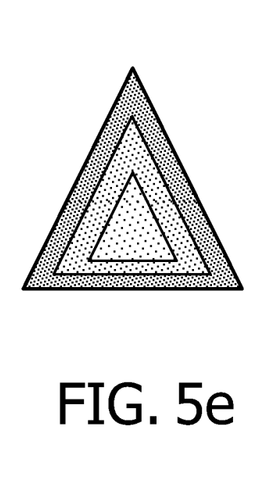
Figure 5F:
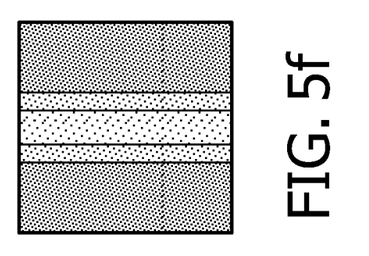
Figure 5G:
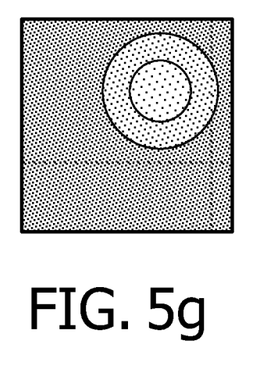
Figure 5H:
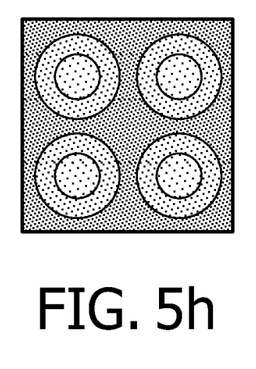
Figure 5I:
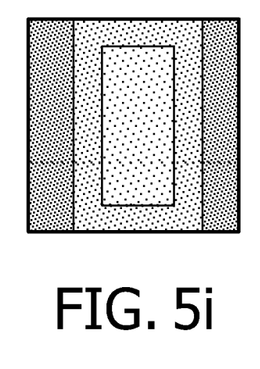
Figure 5J:
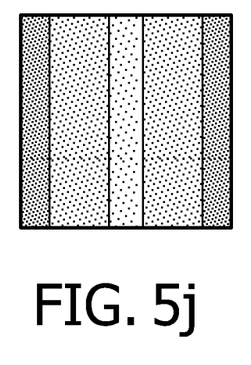
Figure 5K:
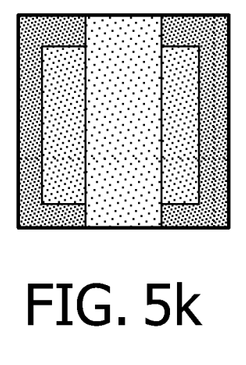
Figure 5M:
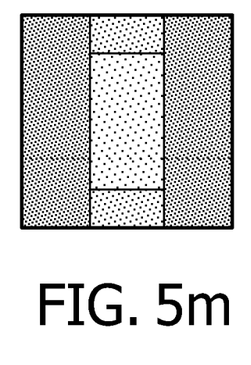
Figure 5N:
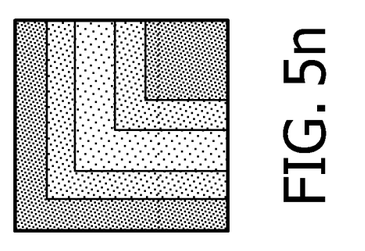
Figure 5P:
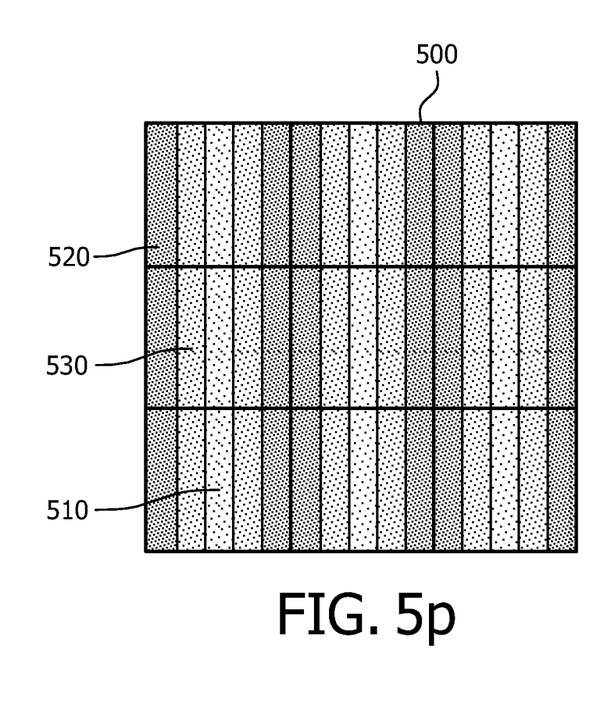
Figure 5Q:
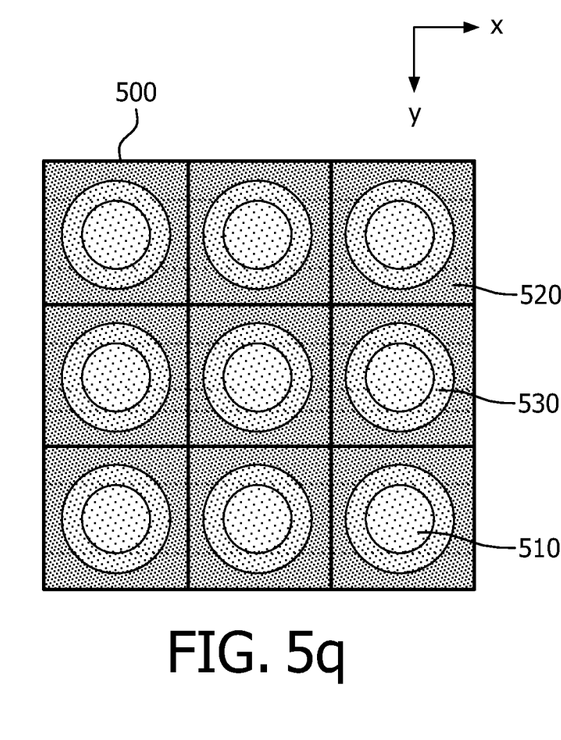

FIG. 5a shows a configuration wherein the collecting electrode 510 is an elongated strip extending from one side to an opposite side of electrode pixel 500, the non-collecting electrode 530 is sub-segmented into two elongated strips positioned neighboring parallel along each of both long sides of the collecting electrode 510 and, similar! y, the steering electrode 520 is sub-segmented into two separate elongated strips positioned neighboring parallel along each of both long sides of the non-collecting electrode 520. In this configuration the non-collecting electrode 530 is always positioned between the collecting electrode 510 and the steering electrode 520. FIG. 5p shows an exemplary threeby-three electrode grid of electrode pixels 500 with this configuration. All segments may be manufactured as strips that continue over multiple electrode pixels 500, which not only may make manufacturing more convenient, also charges are spread out over large areas, resulting in reduced polarization effects. FIG. 5b shows an alternate configuration of the electrode pixel of the direct conversion photon counting detector according to an embodiment of the present invention. In this configuration the collecting electrode 510 is fully surrounded by the non-collecting electrode 530, which in turn is fully surrounded by the steering electrode 520. Again, the non-collecting electrode 530 always lies between the collecting electrode 510 and the steering electrode 520. FIG. 5q shows an exemplary three-by-three electrode grid of electrode pixels 500 with this configuration. Polarization effects will likely be most reduced for the configuration of FIG. 5a than that of FIG. 5b, because charges may be distributed over larger areas, but the configuration of FIG. 5b may have further reduced detectable pulse width and may have even more manufacturing advantages, because the steering electrode 520 extends over all electrode pixels and may be manufactured as one continuous electrode. The configurations shown here are just examples of possible embodiments. For specific manufacturing or design purposes electrode pixel 500 and the segments 510, 520, 520 may be differently shaped, as is shown in FIGS. 5c to 5e. Other variations may be different dimensioned segmentation, as is shown in FIGS. 5f and 5g, alternate positioning of the segments, as is shown in FIG. 5g or multiple collecting electrodes 510 separated from a steering electrode 520 by non-collecting electrodes 530, as is shown in FIG. 5h or more or less hybrid variations, such as for instance between the configurations shown in FIGS. 5a and 5c, as is shown in FIG. 5i. FIG. 5j depicts a configuration in which the respective areas of the collecting electrode 510 and the non-collecting electrode 520 are not 25 approximately the same. Additional measures (such as weighting or signal correction) is necessary to achieve the same results as with configurations where said areas are approximately the same. FIGS. 5k and 5m both depict configurations wherein the collecting electrode 510 is not spatially separated from the steering electrode 520. When the steering electrode 520 is fully spatially separated from the collecting electrode 510 by the non-collecting electrode 530, only an off-set current between the collecting electrode 510 and the non-collecting electrode 530 needs to be taken into account. When the collecting electrode 510 in addition also directly neighbors the steering electrode 520 also an off-set current between the collecting electrode 510 and the steering electrode 520 should be taken into account. FIG. 5n depicts a variation on FIG. 5a, which may be used to form further pixel extending patterns. Based on the above described embodiments a skilled person will be able to derive obvious alternate configurations in light of the present invention. As can be seen in FIGS. 5p and 5q the steering electrode 520 for each electrode pixel is adjacent to the steering electrode 520 of a neighboring electrode pixel. Because of this the steering electrode 520 can be manufactured as a 'continuous' steering electrode extending over at least two neighboring electrode pixels that can be contacted with one voltage source. The lines separating individual electrode pixels in FIGS. 5m and 5n therefore may only indicate 'virtual borders' between electrode pixels and do not necessarily indicate that each electrode pixel is actually a completely separate entity (although, alternatively, this may also be the case of course).

The steering electrode 520 of the configuration shown in FIG. 5n actually is one continuous electrode extending over all electrode pixels.

The steering electrode 530 is operated at a lower, preferably negative, electrical potential than the collecting electrode 510 and non-collecting electrode 520, which both are preferably operated at approximately the same potential (the potential difference between the collecting electrode 510 and the non-collecting electrode 530 should not be more than 10%), most preferably operated at or near ground potential. Because of this electrode pixels of the direct conversion photon counting detector are far less technically challenging to design, manufacture and operate compared to electrode pixels of known direct conversion photon counting detectors with a coplanar grid configuration. A difference between the electrical potential of steering electrode 520 and the electrical potential of both the collecting electrode 510 and the non-collecting electrode should be sufficiently high (preferably between 100 and 200 volts for most common electrode pixels sizes, but this may be reduced to values as low as between 5 and 10 volts for very small electrode pixel sizes of approximately 100 microns), so that an electric field is formed in which inbound electrons are guided only towards the collecting electrode 510 by the steering electrode 520 and that no or at least as little as possible electrodes approach near the non-collecting electrode 530. Preferably the steering electrodes are contacted by a single high voltage source that applies a typical potential ranging between −50 volts and −500 volts. To ensure efficient electron and hole transport a potential difference between the detector cathode and the third electrode pixel segment should preferably be between 100-500 volts per millimeter thickness of the direct conversion layer, more preferably approximately 300 volts per millimeter thickness of the direct conversion layer. Signals representing an incoming electron count are generated from both the collecting electrode 510 and the non-collecting electrode 530. Both signals are usually amplified by signal amplifiers, such as current amplifiers (not shown in FIGS. 5a-5q). To obtain the most accurate electron count a total area of the collecting electrode 510 should be approximately equal to the total area of the non-collecting electrode (preferably at least within 10% of each other, but most preferably as small a difference as possible). This condition ensures that, when electrons are far away from the detector electrode, an induced charge on the collecting electrodes 510 and non-collecting electrodes 520 is approximately the same so that a difference of the signal generated by collecting and non-collecting grid becomes zero. However, it may be necessary or preferred to use embodiments with other area ratios (e.g. for design or manufacturing reasons). To enable this, respective signals from the collecting and non-collecting electrode may be weighted or individually amplified with an adapted gain, such that the signal difference after subtraction approaches zero for far distant electrons.

Figure 6:
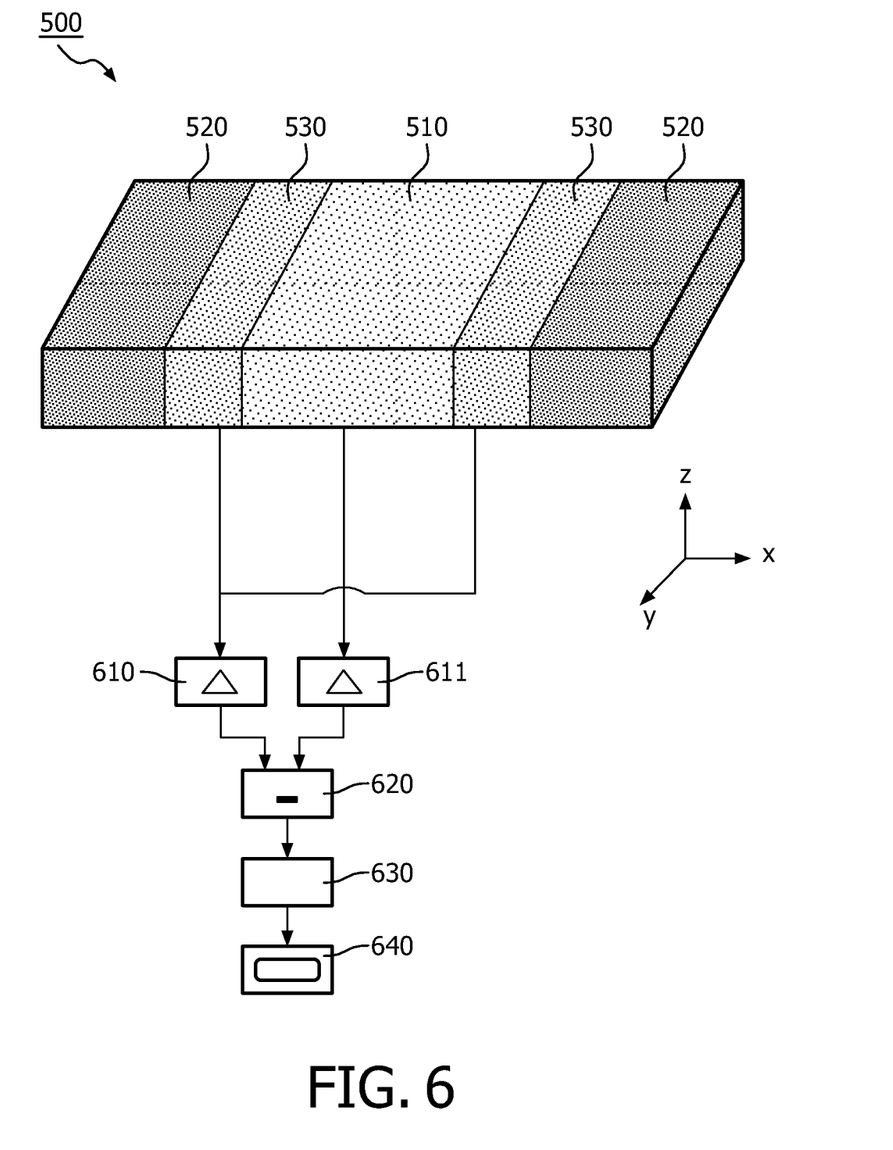
FIG. 6 shows a schematic embodiment of an electrode pixel according to an embodiment of the present invention in perspective view as well as a selection of possible post-processing means.

FIG. 6 shows a perspective view of an electrode pixel with a configuration similar to FIG. 5a. Electrode pixel 500 is connected to electrical circuitry 610, 611, 620, 630, wherein induced signals from the collecting electrode 510 and the non-collecting electrode 530 are amplified by respective current amplifiers 610, 611 and subtracted from each other in subtractor 620 and further processed by processor 630. The processed signals may displayed as an image or as written information to a user on display unit 640.

Figure 7:
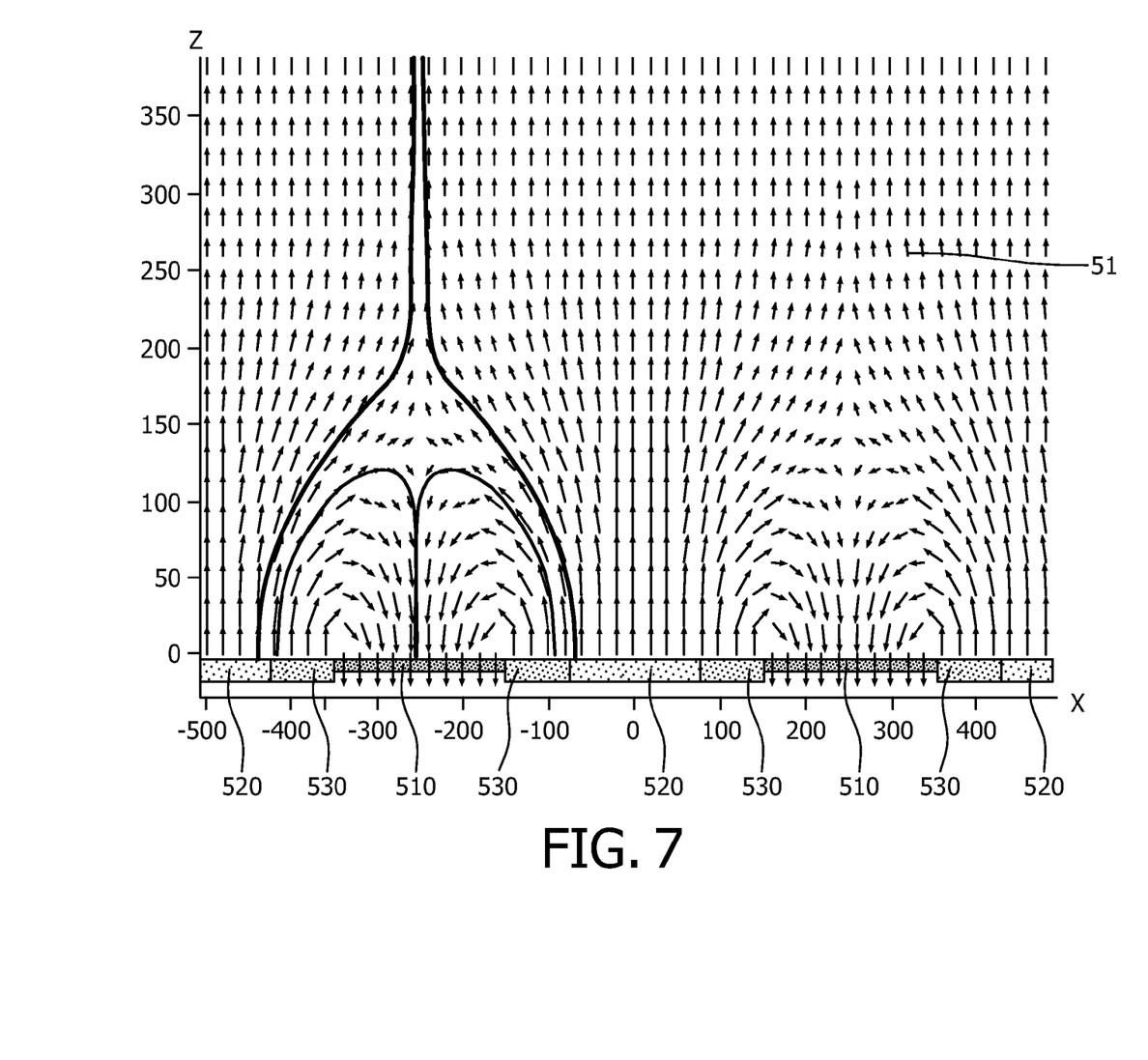
FIG. 7 shows a simulated representation of an electric field within a direct conversion photon counting detector according to an embodiment of the present invention.

A detailed simulation of x-ray radiation on two adjacent detector pixels of a configuration as shown in FIG. 5a was performed for a 3 mm CZT detector with a detector pixel pitch of 500 microns and a detector cathode voltage of −900 volts. Within each detector pixel, the collecting electrode 510 has a width of 150 microns and each of both non-collecting electrode sub-segments 530 have a width of 75 microns. Both the collecting electrode 510 and the non-collecting electrode 530 are set on zero potential. The steering electrode 520 has a width of 200 microns and is set to a potential of −200 volts. Each 500 micron by 500 micron pixel area was homogeneously illuminated by 100 keV photons. The electrical fields within the direct conversion layer 51 were accordingly calculated; a 2D-vector field plot of the electric field is shown in FIG. 7. The figure shows that the steering electrodes 520 bend electric field lines (indicated in the figure by arrows pointing in a local direction of the electric field) in such a way that free electrons generated within a bulk (at a height of at least 200 microns) are guided towards the collecting electrodes 510. The non-collecting electrode 510 is usually not reached by electrons due to repulsion from the steering electrode 520, except they are generated in a relatively small volume at approximately 150 microns height above the steering electrode.

Figure 8:
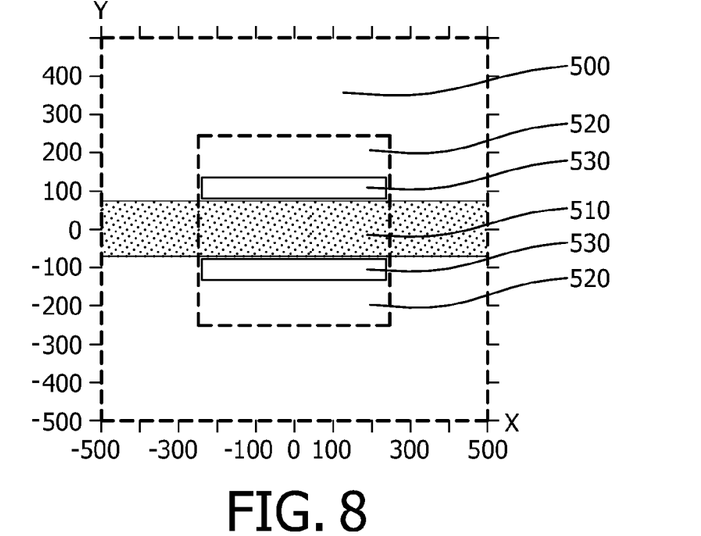
FIG. 8 shows a simulated current density distribution through an embodiment of an electrode pixel of a direct conversion photon counting detector according to an embodiment the present invention.

In the simulations electrons were tracked by means of Monte Carlo simulations which model charge drift and diffusion within the bulk. A simulated current density at the anode plane is seen in FIG. 8 which shows, for one electrode pixel 500, that in fact most of the electrons are collected by the collecting electrode 510. In addition, electrons might be collected by the collecting electrode 510 of neighboring pixels; this is due to the fact that some electrons are generated very close to the pixel border. In these cases, expanding electron clouds might be divided and parts of the clouds might be guided towards the collecting electrodes 510 of neighboring pixels. Only rarely detection events on the steering electrode 530 or on the non-collecting electrodes 520 were observed, which may occur if electrons and holes are generated by photons in the direct conversion layer very close to the steering electrode 520 or the non-collecting electrode 530.

As an additional result of the simulation, a histogram of detected pulse widths for different steering voltages between −50 volts and −200 volts and correspondingly simulated pulse height spectra (for a 2-sigma pulse shaping time of approximately 10 ns) was determined. For the given parameters, very short pulse widths between typically 2 ns and 4 ns were observed. A pulse height spectrum for a −200 volts steering electrode voltage shows a well pronounced photo peak. However, for lower absolute steering voltages, the photo peak degrades in terms of total detected counting events. A closer analysis reveals that at lower steering voltages the repulsion is not strong enough, causing electrons to also be collected by the non-collecting electrodes.

Since the electrode pixel of a direct conversion photon counting detector of the present invention is highly segmented, a number of collecting and non-collecting electrodes per electrode pixel is quite limited, given that a preferred pixel size is to be 1 mm or less. To reduce surface currents between the steering electrode and the non-collecting electrode, a gap of 50 microns between both is preferred. Between the collecting and non-collecting electrodes, smaller gaps are possible, since both are on the same potential. The non-collecting electrodes must have a minimum size, e.g. 50 microns, since otherwise bonding becomes a problem. Hence, 500 microns is a reasonable detector pixel size. An important advantage over electrode designs according to the prior art, especially over steering electrode configurations, is a reduced pulse duration, which helps to support higher count rates, and reduced current densities per anode.

Figure 9:
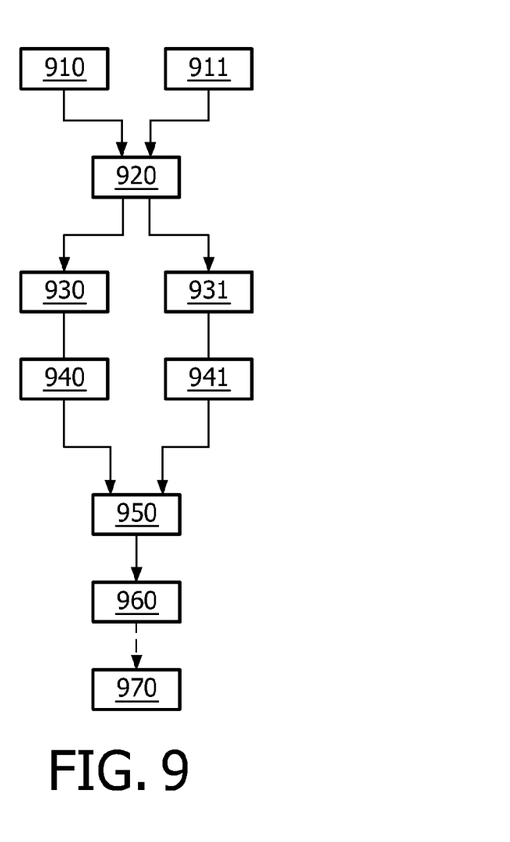
FIG. 9 shows a flowchart for a method to detect photons with a direct conversion photon counting detector according to an embodiment of the present invention.

FIG. 9 shows a flowchart for a method to detect photons with a direct conversion photon counting detector according to the present invention.

An electrical field is applied over the direct conversion layer by applying a negative electrical potential to the detector cathode (910) and an electrical potential to each of the pixel segments of the detector anode (911), wherein an electrical potential of the third electrode pixel segment is lower than the electrical potential of the first electrode pixel segment and the electrical potential of the second electrode pixel segment. To ensure sufficient speed and amount of electron transport towards the detector anode, a potential difference between the potential of the detector cathode and the potential of the third electrode pixel segment should be sufficiently high, preferably at least 300 volts. The direct conversion material is irradiated (920) with photons to generate electrons and holes, which drift towards the detector anode and cathode respectively. The electrons are guided towards the first electrode pixel segments of the electrode pixels by the third electrode pixel segments. A first signal, such as a first current, which is indicative of a count of photons that approached the first electrode pixel segment is generated (930). A second signal, such as a second current, which is indicative of a count of photons that approached the second electrode pixel segment is generated (931). The first and second signals are respectively amplified by a signal amplifier, such as a current amplifier (940, 941). A corrected signal is generated by subtracting (950) the second signal from the first signal. The corrected signal is then further processed (960) to generate image data, e.g. to an image or quantitative data. The processed image data may then be displayed to a user as an image or as written information (970) or used for other purposes, such as analytical studies.

Although the present invention has been described with reference to the specified embodiments, it is not intended to be limited to the specific form set forth herein. Rather, the scope of the present invention is limited only by the accompanying claims. In the claims, use of the verb "comprise" and its conjugations does not exclude the presence of other elements or steps. Although individual features may be included in different claims, these may possibly be combined advantageously, and the inclusion in different claims does not imply that a combination of features is not feasible and/or advantageous. In addition, singular references do not exclude a plurality. Furthermore, reference signs in the claims shall not be construed as limiting the scope.

The invention claimed is:

1. A direct conversion photon counting detector, comprising a detector cathode, a detector anode and a direct conversion material layer positioned between said detector cathode and said detector anode, said detector anode and/or detector cathode comprising a plurality of electrode pixels that are adapted to detect a presence of electrons, wherein at least one of the electrode pixels is segmented into at least a collecting electrode pixel segment, a non-collecting electrode pixel segment and a steering electrode pixel segment, wherein the non-collecting electrode pixel segment is disposed completely between the collecting electrode segment and the steering electrode segment;

wherein an electrical potential of the steering electrode pixel segment is negative and an electrical potential of the collecting electrode pixel segment is positive and an electrical potential of the non-collecting electrode pixel segment is positive;

wherein the detector further comprises electronic circuitry electrically coupled to the collecting electrode segment and to the non-collecting electrode segment to generate a first electrical signal and a second electrical signal respectively, said electronic circuitry comprising a signal subtractor configured to subtract the second electrical signal from the first electrical signal.

2. The detector according to claim 1, wherein said electronic circuitry further comprises at least one electrical signal amplifier and a difference between the potential of the collecting electrode pixel segment and the non-collecting electrode pixel segment is less than ten percent.

3. The detector according to claim 1, wherein the collecting electrode pixel segment is spatially separated from the steering electrode pixel segment by at least the non-collecting electrode pixel segment.

4. The detector according to claim 1, wherein at least one of the collecting electrode pixel segment, non-collecting electrode pixel segment or steering electrode pixel segment is sub-segmented into at least two electrode pixel sub-segments that are spatially separated.

5. The detector according to claim 1, wherein the steering electrode pixel segment extends continuously over at least two neighboring electrode pixels.

6. The detector according to claim 1, wherein the non-collecting electrode pixel segment surrounds the collecting electrode pixel segment and the steering electrode pixel segment surrounds the non-collecting electrode pixel segment.

7. The detector according to any of the claim 1, wherein the collecting electrode pixel segment extends from one side of the electrode pixel to an opposite side of the electrode pixel.

8. The detector according to claim 1, wherein an area covered by the collecting electrode pixel segment is approximately equal to a total area covered by the non-collecting electrode pixel segment.

9. The detector according to claim 1, wherein the non-collecting electrode pixel segment has a width of at least 50 microns.

10. The detector according to claim 1, wherein the electrical potential of the collecting electrode pixel segment approximately matches the electrical potential of the non-collecting electrode pixel, and the electrical potential of the collecting electrode pixel segment and the electrical potential of the non-collecting electrode pixel are at ground potential.

11. The detector according to claim 1, wherein a difference between an electric potential of the collecting electrode pixel segment and an electric potential of the steering electrode pixel segment is between 100 and 200 volts; wherein the steering electrode pixel segment has a potential between −50V and −500V.

12. The detector according to claim 1, wherein a difference between a detector cathode electric potential and the third electrode pixel segment electric potential is between 100 and 500 volts per millimeter thickness of the direct conversion layer.

13. An imaging system, comprising a computed tomography system, comprising a detector according to claim 1.

14. A method to detect photons with a direct conversion photon counting detector, comprising a detector cathode, a detector anode and a direct conversion material layer positioned between said detector cathode and said detector anode, said detector anode and/or detector cathode comprising a plurality of electrode pixels that are adapted to detect a presence of electrons or holes, wherein at least one of the electrode pixels is segmented into at least a collecting electrode pixel segment, a non-collecting electrode pixel segment and a steering electrode pixel segment, wherein the non-collecting electrode pixel segment is disposed completely between the collecting electrode segment and the steering electrode segment;

wherein the detector further comprises electronic circuitry electrically coupled to the first electrode segment and to the second electrode segment, said electronic circuitry comprising a signal subtractor configured to subtract the second electrical signal from the first electrical signal; said method comprising the steps of:

applying an electrical potential to the detector cathode and to each of the pixel segments, wherein the steering electrode pixel segment is operated at a negative electrical potential, the collecting electrode pixel segment is operated at a positive electrical potential, and the non-collecting electrode pixel segment is operated at a positive electrical potential;

irradiating the direct conversion material with photons to generate electrons and holes;

generating a first electrical signal which is indicative of a count of electrons that approached the collecting electrode pixel segment;

generating a second electrical signal which is indicative of a count of electrons that approached the non-collecting electrode pixel segment;

generate a corrected signal by subtracting the second electrical signal from the first electrical signal; and processing the corrected signal to generate detection data.

15. The method according to claim 14, comprising the further step of:

amplifying the first electrical signal and the second electrical signal.

16. The method according to claim 14, wherein the electrical potential of the steering electrode pixel segment is between −50V and −500V.

17. The method according to claim 14, wherein the electrical potentials of the collecting and non-collecting electrode pixel segments are operated at ground potential.

* * * * *